May 24, 1932.    C. L. KENNEDY    1,859,368

CONDENSER INDUCTION MOTOR

Filed Dec. 28, 1929

Witness
Paul Bryant

Inventor
Carlton L. Kennedy
by his attorneys
Van Emen, Fish, Hildreth & Cary

Patented May 24, 1932

1,859,368

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

CONDENSER INDUCTION MOTOR

Application filed December 28, 1929. Serial No. 417,198.

The present invention relates to condenser induction motors.

The objects of the present invention are to provide a condenser induction motor having provision for changing the number of poles to permit efficient operation at a plurality of speeds; to accomplish the pole changing operation with a minimum of external connections; and to provide for satisfactory starting torque on any of the connections.

With these objects in view, the present invention comprises the condenser induction motor hereinafter described and particularly defined in the claims.

Figure 1:
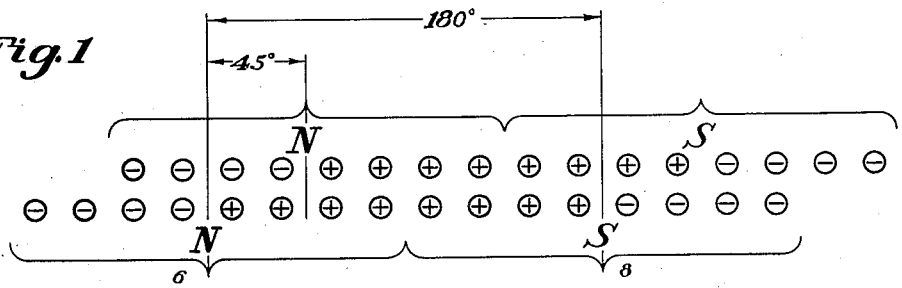
Figure 2:
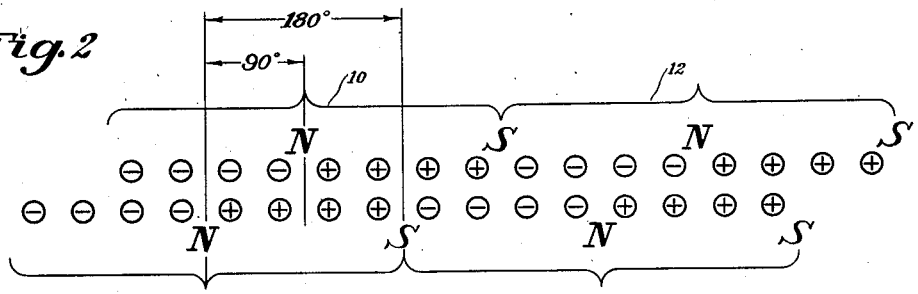
Figure 3:
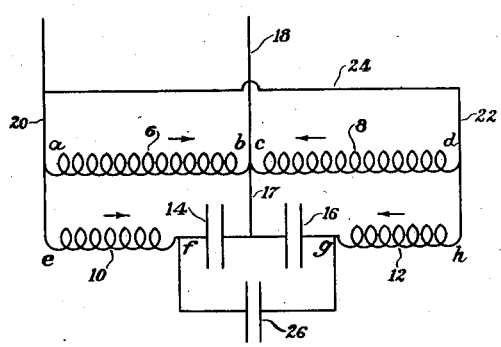

In the accompanying drawings illustrating the preferred form of the invention, Fig. 1 is a develeopment of a portion of the stator windings shown connected for the smaller number of poles; Fig. 2 is a diagrammatic development similar to Fig. 1, but with connections to produce the greater number of poles; Fig. 3 is a diagram of the connections of the main and condenser circuits for the smaller number of poles; and Fig. 4 is a diagram of the connections for the larger number of poles.

The illustrated embodiment of the invention provides for changing the number of poles of a condenser induction motor by changing the polarity of a part of the windings. This operation is explained by reference to Figs. 1 and 2 in which the stator is shown as provided with two main windings 6 and 8, and two condenser windings 10 and 12, the latter being displaced in phase from the main windings. The conductors of the several windings are indicated in the conventional manner, the minus signs indicating an instantaneous current coming out toward the reader and the plus signs an instantaneous current going away from the reader. In Fig. 1 each of the main windings 6 and 8 is shown as distributed over one pole of the motor. With the currents flowing as shown in Fig. 1 the winding 6 forms a north pole and the winding 8 a south pole. The condenser winding 10 forms a north pole displaced 45° from the north pole formed by the main winding 6 and similarly, the condenser winding 12 is displaced 45° from the main winding 8, the complete spread between adjacent poles of opposite polarity being 180°. By merely reversing the polarities of the main winding 8 and the condenser winding 12, leaving the windings 6 and 10 unchanged, the current directions are as shown in Fig. 2. This produces double the number of poles, thus causing the motor to operate at approximately one-half its former speed. Taking 180 electrical degrees as the displacement between a north pole and a south pole, it will be seen that the condenser windings 10 and 12 are respectively displaced from their corresponding main windings by an angle of 90°. The present invention is not limited to the exact displacements of 45° and 90° for the two connections but in any case, it will be noted that the displacement between the main and condenser windings is twice as great for the connection for the greater number of poles as for the smaller number of poles. For reasons which will be made apparent hereinafter, the 45–90° displacement is, however, to be preferred. The diagrams of Figs. 1 and 2 are intended to show only a stator development of a single pair of poles for the high speed connection. Obviously, the windings may be extended to produce any desired number of poles.

Figure 4:
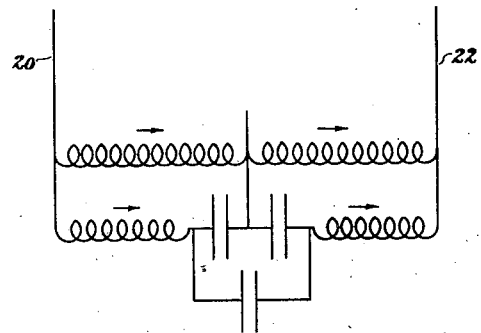

The diagrammatic connections of the windings for operation at high and low speed, respectively, are shown in Figs. 3 and 4. The main windings are indicated at 6 and 8 and the respective condenser windings at 10 and 12. The condenser winding 10 is included in a condenser circuit which is permanently connected across the main winding 6. The condenser circuit includes a condenser 14. Similarly, the circuit in which the condenser winding 12 is included has a series condenser 16, this circuit being permanently connected and parallel with the main winding 8. For convenience, the ends of the main winding 6 are designated as $a$ and $b$, the ends of the main winding 8 as $c$ and $d$, and the ends of the condenser windings 10 and 12 are indicated at $e$, $f$ and $g$, $h$, respectively. The outer points $a$, $e$ and $d$, $h$ are permanently connected, as are also the inner points $b$, $c$ of the main windings. The condensers 14 and 16 are respectively connected to the points *f* and *g* of the condenser windings and both condenser circuits are connected in parallel with their main windings as indicated at 17. The internal connections thus far described are permanent and do not require to be changed. The only changes necessary, for either high or low speed operation, are made in the external leads, of which only three are necessary. These are indicated at 18, which connects with the internal ends of the windings, and at 20 and 22 which connect with the external ends of the windings.

The main windings 6 and 8, as well as the condenser windings 10 and 12, may be wound for any desired number of poles. It will be assumed that the motor when connected for high speed operation has four poles, giving a synchronous speed of 1800 revolutions per minute. When connected for double the number of poles, namely, eight poles, the synchronous speed is reduced to 900 R. P. M.

In order to connect the motor for the smaller number of poles, the leads 20 and 22 are connected together by a wire 24, and line voltage is impressed between the leads 18 and 20, as shown in Fig. 3. For the larger number of poles, that is, for the lower speed, the connections are made as in Fig. 4, line voltage being impressed between the leads 20 and 22 and the lead 18 being inactive. Thus, for the high speed connection, the windings 6 and 8, as well as their corresponding condenser circuits, are all in parallel across the line, whereas for the low speed connection shown in Fig. 4, the windings 6 and 8 are in series and the condenser circuits are also in series. Moreover, it will be seen that while the directions of current flows are unchanged for the windings 6 and 10, they are reversed for the windings 8 and 12 when the connections are changed from those shown in Fig. 3 to those shown in Fig. 4. The general directions of current flow are indicated by arrows in both figures, although it is, of course, obvious that these represent nothing but relative directions of flow and take no account of the phase displacements between the main and condenser windings. The change from parallel to series connection of the windings upon reversal of polarity is essential as in all pole changing motors, in order to preserve approximately the same flux densities.

A condenser 26 is connected around the condensers 14 and 16 at the points *f* and *g*. For the high speed connection shown in Fig. 3, the points *f* and *g* are at the same potential because equal currents flow in the condenser circuits and the condensers 14 and 16 are of the same magnitude. Therefore, the condenser 26 is of no effect. For the low speed connections of Fig. 4, however, the condensers 14 and 16 may be considered to be directly connected in series, there being no current in the branch 17. Therefore, the condenser 26 is in parallel to the condenser assembly formed by the condensers 14 and 16 in series and thus increases the total capacitance of the condenser circuits.

The operation under the high speed connections of Fig. 3 is described as follows:—
In view of the 45° displacement of the condenser windings from the main windings, the fluxes produced by currents in the main windings link with the turns of the condenser windings and thus a voltage is induced by transformer action in each condenser winding even when the rotor is stationary. This transformer action is effective to produce starting torque. Moreover, an additional voltage is generated in the condenser windings by virtue of the rotation of the rotor. This voltage is out of phase with the main winding voltage by 45°, but since it exists only when the rotor is turning, does not contribute to the starting torque. The two induced voltages are added vectorially to the line voltage which is impressed directly across each condenser circuit. In view of the fact that a considerable transformer voltage exists by transformer action which is in phase with the line voltage, a high starting torque is obtained without the necessity of a large number of turns in either of the condenser windings or the use of condensers of more than moderate size.

For the low speed connection of Fig. 4, the condenser windings are displaced 90 electrical degrees from their main windings and hence, no voltage is induced therein by transformer action. A voltage displaced by 90° from the line voltages is induced in the condenser winding by the rotation of the rotor, but since it cannot exist when the rotor is stationary, it is ineffective to produce starting torque. Therefore, the only currents in the condenser circuit which are capable of producing starting torque exist by virtue of the connection of the condenser windings to the line. Moreover, in addition to the fact that at starting the low speed connection does not provide for an additive induced voltage, the current is further limited by the fact that the condensers 14 and 16 are now in series. It is for the purpose of increasing the capacitance of the condenser circuit at the low speed connection that the condenser 26 is employed. Where high starting torque on the low speed connection is not required, this condenser may be omitted. The condenser 26, however, affords the advantage that by its use the condensers 14 and 16 may be made of such a magnitude as to afford proper starting and running conditions for the high speed connection without regard for the operation at low speed, the deficiency of low speed starting torque being then compensated by the parallel condenser.

Although the main and condenser windings are preferably so placed on the stator that they are displaced by 45 electrical degrees for the high speed connection and by 90 electrical degrees for the low speed connection, these particular differences of phase are not essential. If desired, the displacements may be greater than these values but in that case, it is to be noted that a displacement of greater than 90° for the low speed connection will induce in the condenser windings a transformer voltage having a component opposed to the line voltage. On the other hand, phase displacements materially less than the preferred values produce, for the high speed connection, induced voltages in the condenser circuit which may be too nearly in direct phase with the main winding voltages to give satisfactory torques.

It will be seen that the present invention affords a two-speed pole changing condenser induction motor having provision for convenient changes of connections to permit operation at either speed. All changes which are necessary are conveniently accomplished by merely changing the connections to the three external leads, no internal alterations of the motor being required.

Having thus described the invention, what is claimed is:

1. A condenser induction motor having, in combination, two main windings and two condenser circuits, each condenser circuit including a condenser winding and a condenser, and means for connecting the windings having provision for reversing the polarity of one main winding and one condenser winding to change the number of poles.

2. A condenser induction motor having, in combination, two main windings and condenser circuits associated therewith, each condenser circuit comprising a condenser and a condenser winding displaced in phase from its associated main winding, means for connecting the main windings and the condenser circuits in parallel, and means for connecting the main windings in series with reversed polarity to increase the number of poles.

3. A condenser induction motor having, in combination, two main windings and condenser circuits connected across their respective main windings, each condenser circuit comprising a condenser and a condenser winding in series, a single lead connected to one end of each main winding, and separate leads connected to opposite ends of the two main windings, whereby when the separate leads are connected together and to one line with said single lead connected to the other line, the main windings and condenser circuits are connected in parallel, and when line voltage is impressed between said separate leads, the polarity of one main winding and one condenser winding is reversed to double the number of poles.

4. A condenser induction motor having, in combination, two main windings, the polarity of one of which is adapted to be reversed to double the number of poles, a condenser circuit associated with each main winding, each condenser circuit comprising a condenser winding and a condenser in series therewith, one of said condenser windings being also adapted for reversal of polarity, the condenser windings being displaced from their associated main windings by approximately forty-five electrical degrees for the smaller number of poles, and by approximately ninety degree for the larger number of poles.

5. A condenser induction motor having, in combination, two main windings, the polarity of one of which is adapted to be reversed to double the number of poles, a condenser circuit associated with each main winding, each condenser circuit comprising a condenser winding and a condenser in series therewith, one of said condenser windings being also adapted for reversal of polarity, the condenser windings being displaced from their associated main windings by approximately forty-five electrical degrees for the smaller number of poles, and by approximately ninety electrical degrees for the larger number of poles.

6. A condenser induction motor having, in combination, two main windings, condenser circuits connected across their respective main windings, each condenser circuit comprising a condenser and a condenser winding in series, a single lead connected to one end of each main winding, and separate leads connected to opposite ends of the two main windings, whereby when the separate leads are connected together, all of the main windings and the condenser circuits are connected in parallel, the condenser windings being then displaced from the main windings, and whereby when the line voltage is impressed across said separate leads, the polarity of one main winding and one condenser winding is reversed to double the number of poles, and the phase displacement of the condenser windings from their main windings is doubled.

7. A condenser induction motor having, in combination, two main windings, a condenser circuit in parallel with each main winding and comprising a condenser and a condenser winding in series therewith, a common lead connected to one end of each main winding, a connection between said common lead and the point of connection of the two condensers, and an additional condenser connected across the condensers of the two condenser circuits.

8. A condenser induction motor having, in combination, two main windings, two condenser circuits, each including a condenser winding and a condenser, the main windings and the condenser circuits being adapted for parallel connection for high speed operation and for series connection with reverse polarities for low speed operation with double the number of poles, and a condenser connected across the condensers of the condenser circuits to increase the capacitance of the condenser circuits at low speed operation, said condenser being ineffective at high speed operation.

In testimony whereof I have signed my name to this specification.

CARLTON L. KENNEDY.